United States Patent
Follis

(10) Patent No.: US 10,032,133 B2
(45) Date of Patent: Jul. 24, 2018

(54) AUTOMATICALLY IDENTIFYING AUTHORIZED SIGNATORIES FROM AN ORGANIZATION FOR EXECUTING AN ELECTRONIC DOCUMENT

(71) Applicant: Adobe Systems Incorporated, San Jose, CA (US)

(72) Inventor: Benjamin David Follis, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 998 days.

(21) Appl. No.: 14/163,408

(22) Filed: Jan. 24, 2014

(65) Prior Publication Data

US 2015/0213404 A1 Jul. 30, 2015

(51) Int. Cl.
*G06Q 10/10* (2012.01)
*G06F 21/62* (2013.01)

(52) U.S. Cl.
CPC ............ *G06Q 10/10* (2013.01); *G06F 21/62* (2013.01); *G06F 21/6209* (2013.01); *G06Q 10/103* (2013.01); *G06F 21/6218* (2013.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 5,315,504 A | * | 5/1994 | Lemble | G06Q 10/10 700/90 |
| 5,638,447 A | * | 6/1997 | Micali | H04L 9/3255 380/30 |
| 6,401,073 B1 | * | 6/2002 | Tokuda | G06Q 10/0631 705/301 |
| 6,671,805 B1 | * | 12/2003 | Brown | H04L 9/3247 713/170 |
| 6,792,572 B1 | * | 9/2004 | Frohlick | G06Q 10/10 715/236 |
| 6,832,202 B1 | * | 12/2004 | Schuyler | G06Q 10/06311 705/38 |
| 7,039,807 B2 | * | 5/2006 | Spitz | H04L 9/3247 713/170 |
| 7,519,817 B2 | * | 4/2009 | Meier | G06F 21/64 713/168 |
| 7,694,143 B2 | * | 4/2010 | Karimisetty | G06F 21/6227 713/176 |
| 7,698,230 B1 | * | 4/2010 | Brown | G06F 21/64 380/30 |
| 8,437,499 B2 | * | 5/2013 | Case | G06Q 10/10 382/100 |

(Continued)

*Primary Examiner* — Bennett M Sigmond
(74) *Attorney, Agent, or Firm* — Kilpatrick Townsend & Stockton LLP

(57) ABSTRACT

In some embodiments, an electronic signature service receives a document to be electronically signed on behalf of an organization. The electronic signature service automatically determines at least one authorized signatory from the organization for executing the received document. The authorized signatory is determined from data describing an organizational structure and signature authorities for the organization. The electronic signature service electronically provides the document to the authorized signatory via a data network.

15 Claims, 9 Drawing Sheets

(56) References Cited

U.S. PATENT DOCUMENTS

| | | | |
|---|---|---|---|
| 8,468,144 B2* | 6/2013 | Xu | G06F 17/278 |
| | | | 707/706 |
| 8,713,027 B2* | 4/2014 | Forutanpour | G06Q 10/107 |
| | | | 707/748 |
| 8,949,706 B2* | 2/2015 | McCabe | G06Q 10/10 |
| | | | 713/179 |
| 2001/0002485 A1* | 5/2001 | Bisbee | G06Q 20/00 |
| | | | 713/167 |
| 2006/0143157 A1* | 6/2006 | Landsman | G06F 17/2705 |
| 2011/0029445 A1* | 2/2011 | Whittacre | G06Q 10/06 |
| | | | 705/317 |
| 2013/0263283 A1* | 10/2013 | Peterson | G06F 21/6218 |
| | | | 726/28 |

* cited by examiner

AUTOMATICALLY IDENTIFYING AUTHORIZED SIGNATORIES FROM AN ORGANIZATION FOR EXECUTING AN ELECTRONIC DOCUMENT

TECHNICAL FIELD

This disclosure relates generally to computer-implemented methods and systems and more particularly relates to automatically identifying authorized signatories from an organization, such as a corporation or other business entity, for executing an electronic document.

BACKGROUND

An electronic signature service is an online service that allows users to send electronic copies of contracts and other documents to one or more signatories. The electronic signature service may also allow individuals to access electronic copies of documents and to electronically sign the documents. For example, a user of an electronic signature service may upload a contract to the electronic signature service and specify individuals who must sign the contract. The electronic signature service may send a copy of the contract to the specified individuals, e.g., by email or other electronic means, or send an electronic notification to the specified individuals that the contract can be accessed and electronically signed via a website.

When routing electronic documents to an organization for signature, existing electronic signature solutions may not account for the organizational structure or policies of an organization that govern which individuals in the organization have authority to execute the routed documents. For example, certain individuals in a corporation have authority to sign or otherwise execute different documents on behalf of the organization by virtue of the individuals' positions in the corporation's organizational structure as well as one or more corporate policies specifying the signature authorities associated with those positions. For instance, a corporate policy may specify that a contract with a particular corporation becomes effective upon being signed by a plurality of board members for the corporation. However, an individual providing a contract or other document to the corporation may be unaware of the identities of the board members, and would therefore be required to research the corporation in order to specify the names of appropriate signatories in the electronic signature service. Moreover, different groups of signatories for executing a contract may be available. For instance, a corporate policy may specify that contracts for the corporation become effective upon being signed by either the chairperson of the board, a combination of the president and secretary of the corporation, or a plurality of board members. An individual providing a contract or other document to the corporation may be unaware of either the individuals occupying these positions or that corporate policies specify the alternative combinations of signatories that are available for executing the document.

It may be desirable for an electronic signature service to use an organizational structure for an organization to automatically determine one or more appropriate signatories for contracts and other documents.

SUMMARY

According to certain embodiments, an electronic signature service receives a document to be electronically signed and automatically identifies one or more authorized signatories from an organization for executing the received document. The electronic signature service receives the document from a computing device via a network. The electronic signature service retrieves data (e.g. from a database or other suitable data source) that was previously provided by the organization and that describes an organizational structure and signature authorities for the organization. The electronic signature service uses the data describing the organization to automatically identify at least one signatory from the organization who is authorized to sign the received document. The electronic signature service electronically provides the document to at least one computing device associated with the authorized signatory via the network. In some embodiments, the electronic signature service can notify a sender of the document that the authorized signatory has signed the document.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
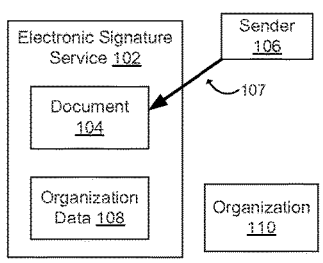
FIG. 1 is a modeling diagram depicting an example of an electronic signature service that can automatically identify authorized signatories from an organization for executing an electronic document according to certain exemplary embodiments.

Computer-implemented systems and methods are disclosed for an electronic signature service to automatically identify authorized signatories from an organization for executing an electronic document. For example, the electronic signature service can use data about the organizational structure of the organization to automatically identify one or more appropriate signatories for contracts and other documents based upon each signatory's position in the organizational structure. In some embodiments, the electronic signature service may be able to automatically identify one or more such signatories even if a given signatory is neither specified by a provider of the document nor identified in the document itself.

The following non-limiting example is provided to help introduce the general subject matter of certain embodiments. An organization may subscribe to an electronic signature service. As part of the subscription process, the organization may provide data about its organizational structure and/or its authorized signatories to the electronic signature service. The organization may specify rules identifying different types of signature authority with respect to the organization.

For example, a rule provided by the organization and used by the electronic signature service can specify that contracts with a corporation may become legally binding upon either (1) the president and the secretary of the corporation signing the contract or (2) the chairperson of the board signing the contract. Subsequently, a vendor in business with the corporation may use the electronic signing service to send a purchase order to the corporation for signature. The vendor may upload the purchase order to the electronic signature service. The vendor may request that the electronic signature service send the purchase order to the appropriate signatories, but may not specify the identities of those signatories.

The electronic signature service can reference the organization data provided by the corporation, including any rules specifying the individual(s) with signature authority for the corporation. In the present example, the electronic signature service may access the rule specifying that either the chairperson of the board or the president and secretary in combination have authority to execute the particular contract (or, perhaps, any contract). Based on the rule, the electronic signature service can electronically route the contract to the chairperson, the president, and the secretary. In response to either the chairperson signing the contract or both the president and the secretary contract (whichever occurs first), the electronic signature service can notify the vendor that the purchase order has been signed and appears to be legally binding upon the corporation.

In accordance with some embodiments, the electronic signature service may be executed on a server system or other computing system and may receive documents to be electronically signed from (and send those documents to) other computing devices via a data network, such as the Internet. Data (e.g., organizational structures, rules, etc.) about organizations participating in the electronic signature service can be stored in a database or other suitable data structure accessible to the electronic signature service. The electronic signature service can attempt to automatically identify the authorized signatories for an organization based on the data pertaining to the organization (e.g., by identifying a president or other officer who is specified in an organizational structure for the corporation and who, according to one or more rules, is authorized to execute contracts or certain types of contracts). The electronic signature service can electronically provide the document to computing devices associated with the authorized signatories, thereby allowing the automatically identified signatories to execute the document.

In some embodiments, the electronic signature service may create and/or populate signature blocks within the document for identified authorized signatories. By interacting with the relevant computing devices via the network, the electronic signature service can route the document to the signatories or their proxies for execution and can determine if/when a required subset of the signatories has signed the routed document. From the perspective of the electronic signature service or a user of the electronic signature service, the document appears to be fully executed by and legally binding upon the organization based on the subset of signatories having signed the document. In some embodiments, the electronic signature service can send a notification to the original sender of the document when the document has been fully executed by the organization.

As used herein, the term "electronic signature service" is used to refer to an application executable by a processing device, firmware, hardware, or any combination thereof that receives, provides, maintains, or otherwise accesses information about senders of documents, signatories for documents, contract, etc. that is sufficient to verify that the documents have been signed. In some embodiments, the electronic signature service can maintain information about electronic documents that is sufficient to legally enforce the terms of the documents. For example, an electronic signature service may store a document such as a contract as well as data indicating that one or more individuals have signed the contract. In some embodiments, an electronic signature service can automatically record and store details of a document's history, thereby allowing for auditing of the process by which the document was signed by various signatories. In some embodiments, an electronic signature service can be hosted or otherwise implemented by a server or group of servers accessible via a data network (e.g., the Internet). In additional or alternative embodiments, an electronic signature service can be hosted or otherwise implemented by a stand-alone computing device.

Any suitable combination of hardware, software, firmware, etc. can be used to implement the workflow and or processes involved in the electronic signature service. In some embodiments, the electronic signature service can be an application that is executable by any suitable processing device. In other embodiments, the electronic signature service can include a combination of executable programming instructions and the processing device used to execute the instructions. In other embodiments, the electronic signature service can include a firmware for implementing the processes involved in the electronic signature service. In other embodiments, the electronic signature service can include a server system that can execute programming instructions for implementing the processes involved in the electronic signature and that can host the data used by the electronic signature service.

As used herein, the term "electronically sign" is used to refer to any action by which an electronic copy of a document may be modified, or otherwise used, to indicate that a signatory has accepted and agreed to one or more provisions of the document. Electronically signing a document may have the same legal effect as printing a copy of the document and physically adding a signatory's signature to the document. Any suitable action can be used to electronically sign a document (perhaps depending on the law of the relevant jurisdiction). Non-limiting examples of electronically signing a document include typing an individual's name in a certain field on the document, adding an electronic image of the individual's handwritten signature to the document, faxing or otherwise electronically transmitted a manually signed copy of the document to the electronic signature service, etc.

As used herein, the term "signatory" is used to refer to a person that is intended to or has signed a document and the term "authorized signatory" is used to refer to a signatory who is authorized (or possibly required) to sign a document in order for the document to be legally binding upon the person's organization.

As used herein, the term "electronically provide" is used to refer to any action by which an electronic copy of a document may be transmitted to a signatory or any electronic communication by which a signatory may be notified that a copy of the document is available for signature.

As used herein, the term "legally binding" is used to refer to a document requiring one or more legally enforceable actions by one or more individuals. For example, a document such as a contract may become legally binding when each party to the contract may institute a legal action in order to compel action by another party to the contract.

As used herein, the term "organization" is used to refer to entity including one or more individuals organized for working collectively to achieve one or more common goals. Non-limiting examples of an organization include business entities (e.g., small businesses, partnerships, sole proprietorships, corporations, etc.), government entities (e.g., government agencies, legislative bodies, military units, etc.), non-profit organizations, etc.

As used herein, the term "organizational structure" is used to refer to a manner in which areas of responsibility are allocated to individuals or groups of individuals in an organization. An organizational structure may be hierarchical (e.g., a corporation) or non-hierarchical (e.g., a partnership) and may designate positions, titles, roles, responsibilities, etc. of individuals or groups of individuals within the organization. In some embodiments, prior to receiving documents to be executed by the organization, an electronic signing service may receive an electronic document from an organization that identifies an organizational structure as well as the identities of individuals assigned to positions in the organizational structure and rules governing the signature authority for positions in the organizational structure.

Any rule specifying any type of signature authority for an organization can be used by the electronic signature service to automatically identify signatories, either for routing a document from a sender outside the organization to one or more signatories within the organization and/or from a sender within the organization to one or more signatories within the organization. In some embodiments, the electronic signature service can be used to determine an appropriate level of signature authority for a document. For example, a sender may be an individual or entity that belongs to the organization and that is responsible for managing contracts or other legal documents for the organization. The individual or entity responsible for management of legal documents may utilize the electronic signature service to determine an appropriate level of signature authority for a document. For example, the contract management entity may be unaware of which individuals in the organization are authorized to sign a given contract or other document. Any suitable process can be used to determine the subject matter of the document. For example, the contract management entity may specify the subject matter of the document, the electronic signature service may determine the subject matter of the document by analyzing the content of the document, and/or the electronic signature service may determine potential types of subject matter in the document and present suggested types of subject matter via a graphical interface for selection by the contract management entity. The electronic signature service can determine an appropriate level of signature authority for the document based on the subject matter of the document and the rules for the organization. For example, the rules for the organization may specify that certain types of documents should be executed by manager, vice presidents, senior vice presidents for certain divisions, etc. The electronic signature service may present an interface to the contract management entity for verifying the signatories that are automatically identified using the rules. After the contract management entity has verified the suggested signatories via the interface, the electronic signature service can route the document for signature without further involvement from the contract management entity.

In some embodiments, the electronic signature service can determine that the authorized signatories include individuals such as board members for the organization or officers (or groups of officers) for the organization. In one non-limiting example, the electronic signature service can determine that a required subset of authorized signatories has signed the routed document by determining that a specified number of board members have signed the document. In another non-limiting example, the electronic signature service can determine that a required subset of authorized signatories has signed the routed document by determining that a specified officer or a specified group of officers has signed the document.

As used herein, the term "board member" is used to refer to a member of a board, committee, or other similar group of individuals having joint responsibility or authority over one or more activities of an organization. Boards, committees, or other similar groups can be used by both private organizations (e.g., corporations, non-profit groups, etc.) and public organizations (e.g., a military promotion board, a city council, etc.). A board's activities are determined by the powers, duties, and responsibilities delegated to it or conferred on it by an authority outside itself. In a non-limiting example, these matters may be detailed in the organization's bylaws. The bylaws commonly also specify the number of members of the board, how they are to be chosen, and when they are to meet. In some embodiments, action by a board on behalf of an organization (such as execution of contracts) may only require action by a designated number of board members regardless of actions taken by any specific board member. For example, each signature of a board member may have equal effect with respect to execution of a contract.

As used herein, the term "officer" is used to refer to an individual having responsibility for or authority to perform one or more organizational operations, activities, goals, etc. For example, organizations such as corporations or military units may include officers appointed or otherwise selected to perform one or more actions on behalf of the organization. Such actions may include entering into contracts that legally bind a corporation or issuing an order directing a military unit to perform one or more collective tasks. In some embodiments, an officer may be an individual authorized to unilaterally perform one or more functions that legally bind the organization.

In additional or alternative embodiments, the electronic signature service can identify at least some of the authorized signatories by analyzing content of the document, even if the document's content does not include the names the authorized signatories in the document. The electronic signature service can determine one or more authorized signatories based on the analyzed content. In one example, the electronic signature service can determine that the analyzed content includes at least one reference to at least one function for which a department of the organization is responsible. The electronic signature service can identify one or more authorized signatories from the department. In another example, the electronic signature service can determine that the analyzed content references one or more functions for which one or more individuals having a specified role in the organization are responsible. For example, a corporation can include different roles with different signature authority, such as "in-house counsel" having authority to sign powers of attorney, "procurement managers" having signature authority to sign certain vendor agreements, etc. The electronic signature service can identify one or more authorized signatories by determining that the signatories have roles with the appropriate signature authority for the document.

As used herein, the term "department" is used to refer to a sub-division of an organization responsible for performing at least one function or overseeing at least one type of activity that is specific to that sub-division. In some embodiments, a department can be identified by reference to a hierarchy for an organization. For example, departments for a specific branch of government may include individual agencies under the responsibility of a particular office of the executive branch, geographic sub-divisions (e.g., counties) under the responsibility of an office having responsibility for a larger geographic area (e.g., a state), etc. In other embodiments, a department can be identified by an area of responsibility without requiring a hierarchy for the organization. For example, departments for a professional organization such as a law firm may be identified by specialized practice areas such as litigation, patent prosecution, etc.

As used herein, the term "role" is used to refer to an individual having a responsibility or authority in an organization by virtue of the individual having a certain position in the organization. For example, a role in a corporation may be a legal secretary. Although the specific individuals having the role of "legal secretary" may change, any responsibility or authority associated with the role would remain constant regardless of the particular individual assigned to the role.

In additional or alternative embodiments, the electronic signature service may provide one or more auditing functions for documents signed via the service. For example, the electronic signature service may generate and record audit information that describes how the electronic signature service used an organizational structure, rules provided by the organization, and/or other organization data to identify authorized signatories for the document. For example, the electronic signature service may log auditing data such as the date on which organization data (e.g., organizational structure, rules, etc.) was provided, the identity of the individual who provided the organization data to the electronic signature service, which rules from the organization data were used to identify authorized signatories, etc. In additional embodiments, the electronic signature service can provide the audit information to one or more entities identified in the document to be signed (e.g., the parties to a contract).

Referring now to the drawings, FIG. 1 is a modeling diagram depicting an example of an electronic signature service 102 that can automatically identify authorized signatories from an organization 110 for executing an electronic document 104.

Figure 12:
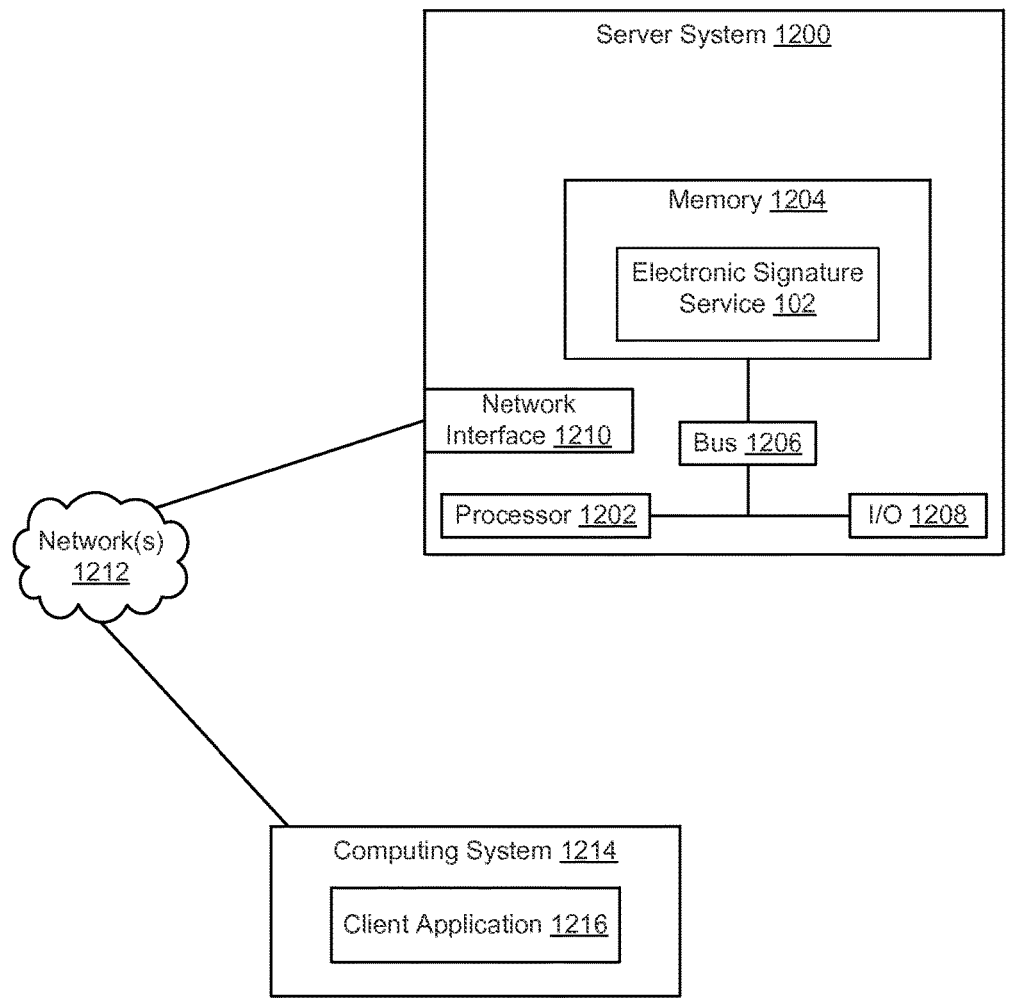
FIG. 12 is a block diagram depicting an example server system for implementing certain embodiments.

The electronic signature service 102 can be hosted or otherwise implemented by any suitable server system and can be accessed by other computing devices via any suitable data network (see, e.g. FIG. 12). For example, the electronic signature service 102 may be accessed by computing devices operated by a sender 106 of a document and a recipient (e.g., organization 110) of the document. In one example, the electronic signature service 102 may be executed on a server system accessible by other computing devices via the Internet (e.g., via a Web-based or other network interface). In another example, the electronic signature service 102 may be executed on a server system accessible by other computing devices via an electronic mail or fax communication system.

A sender 106 can thus provide the document 104 to the electronic signature service 102 via any suitable electronic communication 107. One non-limiting example of a sender 106 is an individual or entity external to the organization 110, such as a vendor doing business with the organization. Another non-limiting example of a sender 106 is an individual or entity within the organization 110, such as an individual in the legal department of an organization 110 who wishes to determine the proper level of signature authority (e.g. manager, director, vice-president, chief executive officer, etc.) for the document 104. Non-limiting examples of performing a suitable electronic communication 107 include uploading the document 104 via a website for accessing the electronic signature service 102, sending the document 104 in an e-mail attachment to a server that executes or is in communication with the electronic signature service 102, faxing the document 104 to a server that executes or is in communication with the electronic signature service 102, etc.

The electronic signature service 102 can store organization data 108 describing an organization 110. The organization data 108 can include any data that can be used by the electronic signature service 102 to identify authorized signatories from the organization 110 for executing the document 104. Non-limiting examples of the organization data 108 include data describing the structure of the organization, data identifying the individuals involved in or associated with the organization, data specifying the authority of different individuals and/or positions, departments, etc. to enter into contracts or perform other actions on behalf of the organization, etc. The organization data 108 can be provided to the electronic signature service 102 via any suitable process. In one non-limiting example, an organization 110 may subscribe to the electronic signature service 102 in order to facilitate the execution of documents on behalf of the organization. The organization 110 may provide the organization data 108 to the electronic signature service 102 during the subscription process or at some point subsequent to the subscription process. In another non-limiting example, the electronic signature service 102 can be configured to automatically determine at least some of the organization data 108 via publically available records (e.g., records of business entities registered with the secretary of state or other appropriate government entity) stored in public or private databases accessible by the electronic signature service 102.

The electronic signature service 102 can automatically assign signatories to the document 104 by adding, modifying, or replacing previously identified signatories in the document 104 or by otherwise associating data with the document 104 that identifies the signatories. For example, FIG. 2 is a modeling diagram depicting the electronic signature service 102 automatically generating signature blocks for the electronic document 104 based on the organization data 108 pertaining to an organization.

The electronic signature service 102 can generate signature blocks 202*a*, 202*b* based on organization data 108 such as an organizational structure 200 and/or rules 201 accessible to the electronic signature service 102. The organization data 108 can identify multiple individuals or other entities in the organization that have responsibility for one or more functions of the organization (e.g., names and roles of officers of the organizations, organizational departments, etc.). The rules 201 can specify or otherwise identify signature authority to execute documents on behalf of the organization that is held by individuals or other entities or groups of individuals or entities. The organization 110 can specify the rules 201. In some embodiments, the rules 201 can specify or otherwise identify signature authority based on corporate structure alone. In additional or alternative embodiments, the rules 201 can specify signature authority based on a given circumstance (e.g., route all agreements from a specific customer or client to a specific sales manager, even if additional sales managers would otherwise have authority to sign the agreements). The electronic signature service 102 can generate signature blocks for each individual or groups of individuals that have authority to execute the documents, according to the rules 201 and/or other organization data 108.

The electronic signature service 102 can generate appropriate signature blocks for multiple subsets of authorized signatories having the authority to execute the document 104. As depicted in FIG. 2, the electronic signature service 102 generates one or more signature blocks 202*a* for one or more signatories 204*a* in a first subset of authorized signatories and generates one or more signature blocks 202*b* for one or more signatories 204*b* in a second subset of authorized signatories. In one non-limiting example, the rules 201 for a particular organization 110 such as a corporation may specify that a document 104 such as a contract may become legally binding upon either (1) a majority of board members signing the document or (2) both the president and the secretary of the corporation signing the document. The signature blocks 202*a* may be signature blocks for the board members (i.e., the signatories 204*a*). The signature blocks 202*b* may be signature blocks for the president and the secretary (i.e., the signatories 204*b*). In another non-limiting example, the rules 201 for a particular organization 110 may specify individuals who are responsible for one or more functions or other items identified in the document 104 (e.g., a manager, director, vice president, senior vice president, etc.).

Figure 2:
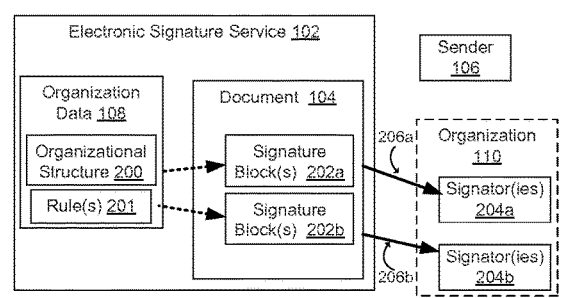
FIG. 2 is a modeling diagram depicting an example of an electronic signature service automatically generating signature blocks for an electronic document based on organization data according to certain exemplary embodiments.

Although FIG. 2 depicts both the signature blocks 202*a* and the signature blocks 202*b* as being included within the same document 104 for illustrative purposes, any suitable implementation is possible. In some embodiments, the electronic signature service 102 may generate a copy of the document 104 that includes all signature blocks 202*a*, 202*b*. In other embodiments, the electronic signature service 102 may generate a first copy of the document 104 that includes the signature blocks 202*a* for routing to signatories 204*a* and a second copy of the document 104 that includes the signature blocks 202*b* for routing to signatories 204*b*. In some embodiments, the sender 106 can provide input to the electronic signature service 102 that specifies whether a single electronic copy of the document 104 with all signature blocks 202*a*, 202*b* should be generated or different electronic copies of the document 104 respectively including signature blocks 202*a*, 202*b* should be generated.

In additional or alternative embodiments, the electronic signature service 102 can modify a database such that a document identifier for a record corresponding to the document 104 is associated with both (i) a first set of records in a first table that respectively correspond to the signature blocks 202*a* and (ii) a second set of records in a second table that respectively correspond to the signature blocks 202*b*. Signatures received from signatories 204*a*, 204*b* can be stored in respective records corresponding to the signature blocks 202*a*, 202*b*. After a sufficient number of signatories have provided signatures to the electronic signature service 102, the electronic signature service 102 may use data stored in the database to generate a copy of the document 104 with the appropriate signature blocks (i.e., either the signature blocks 202*a* or the signature blocks 202*b*) and the associated signatures.

The electronic signature service 102 can notify the signatories 204*a*, 204*b* that the document 104 is available for signature via any suitable electronic communications 206*a*, 206*b*. In some embodiments, the electronic communications 206*a*, 206*b* can include copies of the document 104 with the signature blocks 202*a*, 202*b*. In one example, the electronic signature service 102 can send e-mails to the signatories 204*a*, 204*b* with copies of the document 104 having the signature blocks 202*a*, 202*b* as e-mail attachments. In another example, the electronic signature service 102 can transmit copies of the document 104 having the signature blocks 202*a*, 202*b* via facsimile or other electronic communication channels to the signatories 204*a*, 204*b*. In other embodiments, the electronic communications 206*a*, 206*b* can notify the signatories 204*a*, 204*b* without including copies of the document 104. For example, the electronic signature service 102 can send electronic messages (e.g., e-mail, text message, etc.) that include a link to a website via which the signatories 204*a*, 204*b* may access and sign the document 104 using the electronic signature service 102. In other embodiments, the electronic communications 206*a*, 206*b* can include copies of the document 104 with the signature blocks 202*a*, 202*b* as well as a link to a website or other network location via which the signatories 204*a*, 204*b* may access and sign the document 104 using the electronic signature service 102.

Figure 3:
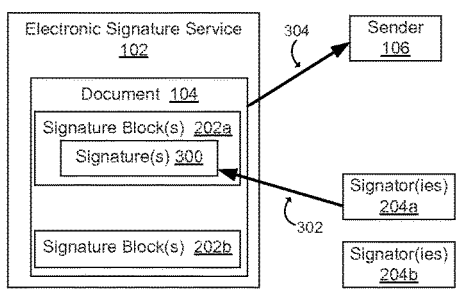
FIG. 3 is a modeling diagram depicting an example of an electronic signature service notifying a sender that a document is fully executed in response to one of the subsets of authorized signatories signing the document according to certain exemplary embodiments.

The electronic signature service 102 may subsequently notify the sender 106 that a sufficient number of authorized signatories have signed the document 104. For example, FIG. 3 is a modeling diagram depicting the electronic signature service 102 notifying the sender 106 that the document 104 is fully executed in response to one of the subsets of authorized signatories signing the document 104. Each of the signatories 204*a* from the first subset of authorized signatories may electronically sign the document 104 with the signature(s) 300 via suitable electronic communication(s) 302. The electronic signature service 102 can notify the sender 106 via a suitable electronic communication 304 that a sufficient number of the authorized signatories 204a (e.g., a majority of board members) have signed the document 104. In some embodiments, the electronic signature service 102 can use one or more processes to verify that the entity from which one of the signatures 300, 400 were received is actually one of the authorized signatories 204a, 204b. Any suitable process for verifying a signatory can be used. Non-limiting examples of such processes include requiring the signatory to provide one or more credentials or other authentication information (e.g., password, personal identification number, etc.) to the electronic signature service 102, requiring the signatory to provide biometric data (e.g., a fingerprint) to the electronic signature service 102, verifying that the network identifier (e.g., an IP address) from which a signature is received is known to the electronic signature service 102 or belongs to a trusted domain, etc.

Figure 4:
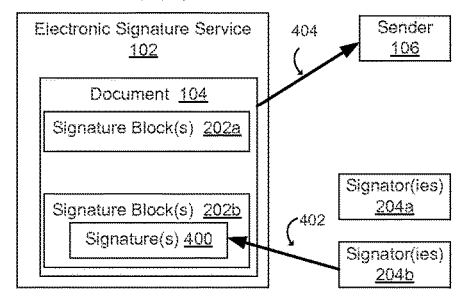
FIG. 4 is a modeling diagram depicting an example of an electronic signature service notifying a sender that a document is fully executed in response to another of the subsets of authorized signatories signing the document according to certain exemplary embodiments.

Additionally or alternatively, the electronic signature service 102 can notify the sender 106 that the document 104 is fully executed in response to the other subset of authorized signatories signing the document 104, as depicted in FIG. 4. For example, each of the signatories 204b from the second subset of authorized signatories may electronically sign the document 104 with the signature(s) 400 via suitable electronic communication(s) 402. The electronic signature service 102 can notify the sender 106 via a suitable electronic communication 404 that a sufficient number of the authorized signatories 204a (e.g., both the president and the secretary) have signed the document 104.

Any suitable electronic communications 302, 304, 402, 404 can be used to provide the respective electronic signatures 300, 400 and/or notify the sender 106 (e.g., e-mail, text message, etc.). In some embodiments, the electronic communications 302, 402 can include the signatories 204a, 204b accessing the electronic signature service 102 via a web site to add the respective electronic signatures 300, 400 to the document 104. In additional or alternative embodiments, the electronic communications 302, 402 can include the signatories 204a, 204b sending copies of the document 104 with the respective electronic signatures 300, 400 to the electronic signature service 102 via suitable electronic communication channels (e.g., e-mail attachment, facsimile transmission, etc.).

Although FIGS. 2-4 depict multiple groups of authorized signatories 204a, 204b, other implementations are possible. In some embodiments, the electronic signature service 102 may determine from the organization data 108 that a single signatory or group of signatories has the authority to execute the document 104. The electronic signature service 102 can provide the document 104 to the signatory or group of signatories.

Figure 5:
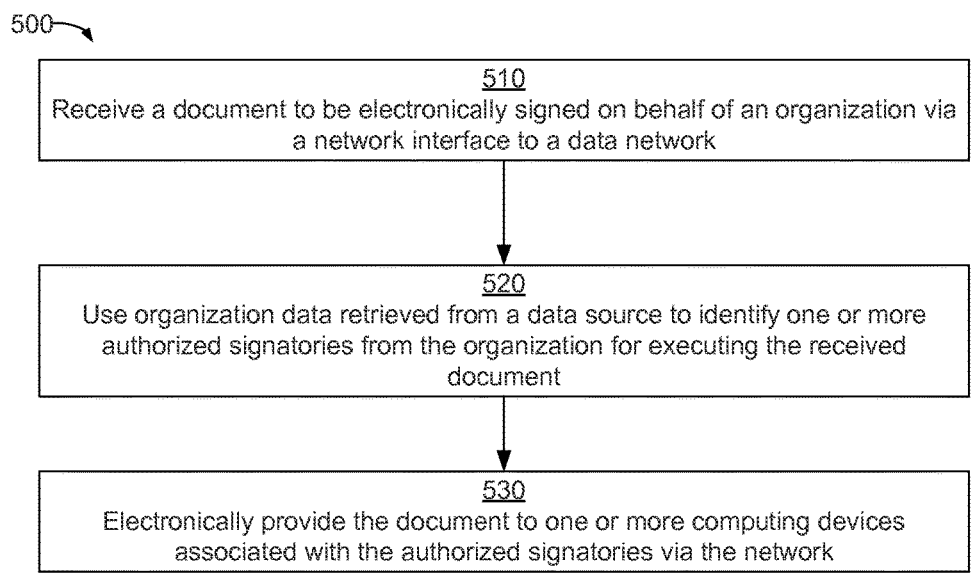
FIG. 5 is a flow chart illustrating an example method for automatically identifying authorized signatories from an organization for executing an electronic document according to certain exemplary embodiments.

FIG. 5 is a flow chart illustrating an example method 500 for automatically identifying authorized signatories from an organization 110 for executing an electronic document 104. For illustrative purposes, the method 500 is described with reference to the exemplary implementation depicted in FIGS. 1-4. Other implementations, however, are possible.

The method 500 involves receiving an electronic document 104 to be electronically signed on behalf of an organization via a network interface to a data network, as depicted in block 510. The electronic signature service 102 can receive the electronic document 104 via any suitable data or communication network from a computing device operated by the sender 106. For example, the electronic signature service 102 can receive a suitable electronic communication 107 via a network interface to a data network. The electronic communication 107 can provide the electronic document 104 from the sender 106 to the electronic signature service 102, as described above with respect to FIG. 1.

The method 500 also involves using organization data 108 retrieved from a data source to determine one or more authorized signatories from the organization 110 for executing the received document 104, as depicted in block 520. For example, the electronic signature service 102 can be executed by a suitable processing device to select the organization data 108 for the organization 110 to which the document 104 is to be directed. The organization data 108 can be selected from a database or other suitable data structure based on an identifier for the organization 110. The identifier for the organization 110 can be included in one or more electronic communications received from a computing device associated with the sender 106. In some embodiments, the sender 106 may be responsible for identifying the organization 110 to which the document is directed. In other embodiments, the electronic signature service 102 may be configured to identify (or attempt to identify) the organization 110 (e.g., by a keyword search of the document 104) if the sender 106 does not otherwise specify it. The electronic signature service 102 can retrieve organization data 108 from a database or other suitable data structure stored in a computer-readable medium. In some embodiments, the electronic signature service 102 can access a data source, such as a database, in which the organization data 108 is stored and use the identifier for the organization 110 to retrieve the organization data 108. The organization data 108 can include, for example, data describing the organizational structure 200 and rules 201. The electronic signature service 102 can reference the organization structure 200 and the rules 201 in the organization data 108 to automatically identify or otherwise determine one or more authorized signatories for executing the document 104. The electronic signature service 102 can identify signatories having the appropriate signature authority for the document 104 by performing one or more suitable algorithms or other processes using the organizational structure 200 and/or the rules 201. Non-limiting examples of such algorithms or processes are described above with respect to FIG. 2 above and in greater detail below with respect to FIGS. 6-11.

The method 500 also involves electronically providing the document 104 to the one or more authorized signatories, as depicted in block 530. Any suitable electronic communications 206a, 206b can be used to provide the document 104 to authorized signatories 204a, 204b, as described above with respect to FIG. 1. For example, the electronic signature service 102 can transmit a copy of the document 104 to the signatories 204a, 204b via a suitable data network and/or transmit a notification to the signatories 204a, 204b via a suitable data network that the document 104 can be accessed via a specified website.

Figure 6:
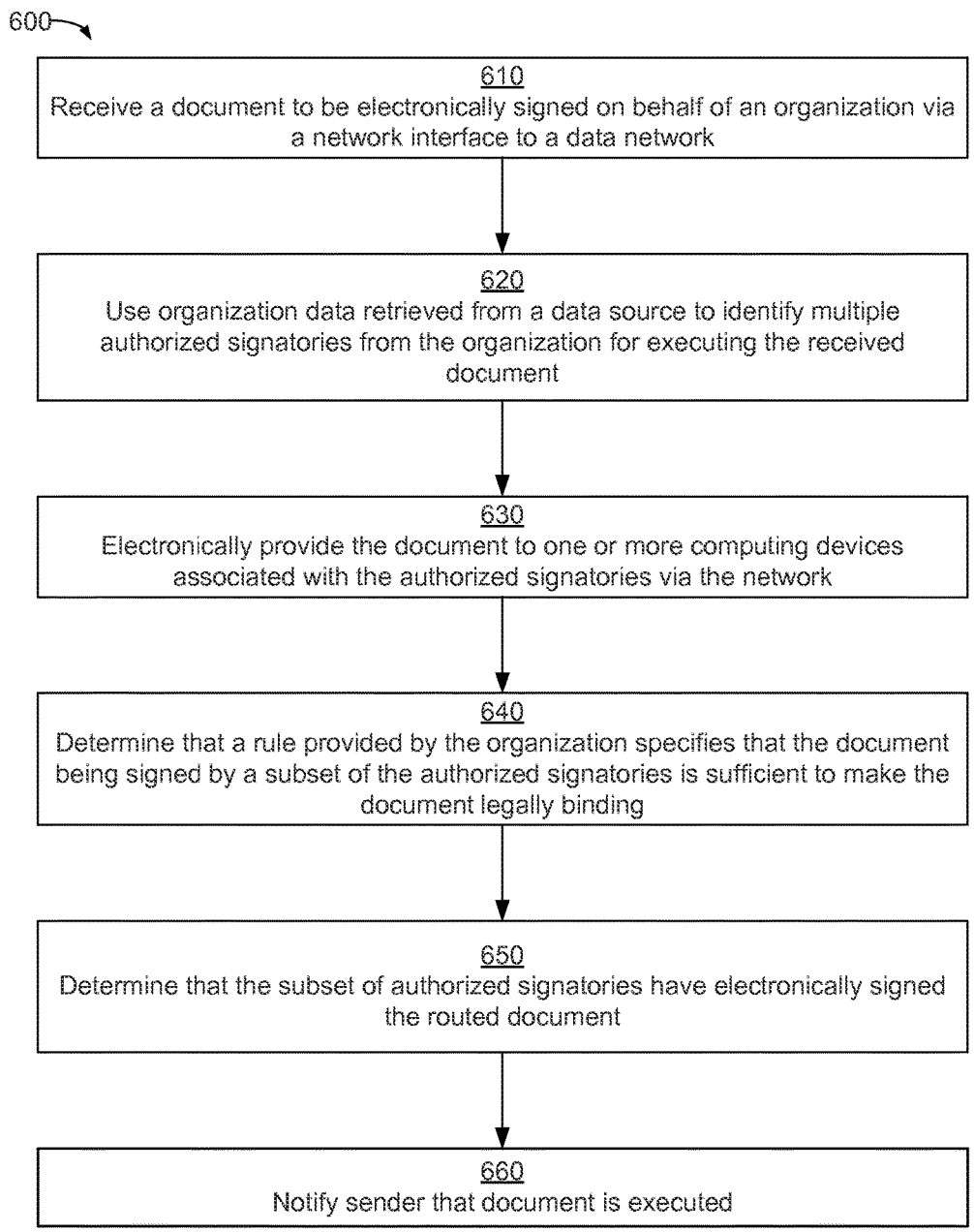
FIG. 6 is a flow chart illustrating an example method for automatically identifying subsets of authorized signatories from an organization for executing an electronic document according to certain exemplary embodiments.

FIG. 6 is a flow chart illustrating an example method 600 for automatically identifying subsets of authorized signatories from an organization 110 for executing an electronic document 104. For illustrative purposes, the method 600 is described with reference to the exemplary implementation depicted in FIGS. 1-4. Other implementations, however, are possible.

The method 600 involves receiving an electronic document 104 to be electronically signed on behalf of an organization via a network interface to a data network, as depicted in block 610. For example, the electronic signature service 102 can receive the document 104 from a sender 106 via a suitable electronic communication 107, as described above with respect to FIGS. 1-4 and in a similar manner as that described above with respect to block 510 in FIG. 5.

The method 600 also involves using organization data 108 retrieved from a data source to identify authorized signatories from the organization 110 for executing the received document 104, as depicted in block 620. For example, the electronic signature service 102 can automatically identify or otherwise determine a plurality of authorized signatories, as described above with respect to FIGS. 1-4 and in a similar manner as that described above with respect to block 520 in FIG. 5.

The method 600 also involves electronically providing the document 104 to authorized signatories, as depicted in block 630. Any suitable electronic communications 206a, 206b can be used to provide the document 104 to authorized signatories 204a, 204b, as described above with respect to FIG. 1. For example, the electronic signature service 102 can transmit a copy of the document 104 to the signatories 204a, 204b via a suitable data network and/or transmit a notification to the signatories 204a, 204b via a suitable data network that the document 104 can be accessed via a specified website.

The method 600 also involves determining that a rule provided by the organization 110 specifies that the document 104 being signed by a subset of the authorized signatories is sufficient to make the document legally binding, as depicted in block 640. For example, a processing device executing the electronic signature service 102 can reference one or more of the rules 201 included in the organization data 108. The referenced rule provided by the organization 110 can specify that the document is legally binding if certain specified officers of the organization have signed the document 104, if a specified number of board members have signed the document 104, if one or more signatories having an appropriate role in the organization 110 have signed the document 104, etc., consistent with the applicable organizational structure 200 and rules 201. Non-limiting examples of the electronic signature service 102 identifying and applying such rules provided by an organization 110 are discussed below with respect to FIGS. 6-10.

In some embodiments, the electronic signature service 102 may execute one or more processes that account for both sets of signatories 204a, 204b returning signed copies of the document 104. In one non-limiting example, the electronic signature service 102 may notify the signatories 204a that no further signatures are required after determining that all of the signatories 204b have signed the document 104. In another non-limiting example, the electronic signature service 102 may bar the signatories 204a from accessing the document 104 via a website after determining that all of the signatories 204b have signed the document 104. In another non-limiting example, the electronic signature service 102 may simply discard any signatures 300 received from signatories 204a after determining that all of the signatories 204b have signed the document 104.

The method 600 also involves determining that the subset of authorized signatories has signed the routed document such that the document appears to be fully executed by and legally binding upon the organization, as depicted in block 650. For example, a processing device executing the electronic signature service 102 can reference one or more of the rules 201 each time one of the electronic communications 302 and/or one of the electronic communications 402 is received by the electronic signature service 102. The electronic signature service 102 can determine whether the received signatures 300 or the received signatures 400 satisfy the referenced rule(s). For example, the electronic signature service 102 can determine that certain specified officers of the organization have signed the document 104, that a specified number of board members have signed the document 104, that one or more signatories having an appropriate role in the organization 110 have signed the document 104, etc. Non-limiting examples of processes for determining which signatories have signed a document include monitoring a master copy of the document 104 on a server to determine if the document has been modified, updating a database each time a signed copy of the document is received from a signatory, etc.

In some embodiments, if the received signatures 300 or the received signatures 400 satisfy the referenced rule(s), the method 600 also involves notifying the sender that the document 104 is executed, as depicted in block 660. The electronic signature service 102 can notify the sender 106 that the document has been executed via one or more suitable electronic communications 304, 404. For example, a processing device executing the electronic signature service 102 can notify the sender 106 by sending an electronic communication 304 or an electronic communication 404 to a computing device associated with the sender 106, as described above with respect to FIGS. 3-4.

In some embodiments, notifying the sender 106 that document 104 is executed can involve notifying the sender 106 that a sufficient number of signatures have been received. In additional or alternative embodiments, notifying the sender 106 that document 104 is executed can involve notifying the sender 106 that the document 104 appears to be legally binding or that some other legal effect appears to have been achieved as a result of a sufficient number of signatures from authorized person(s) having been received.

Figure 7:
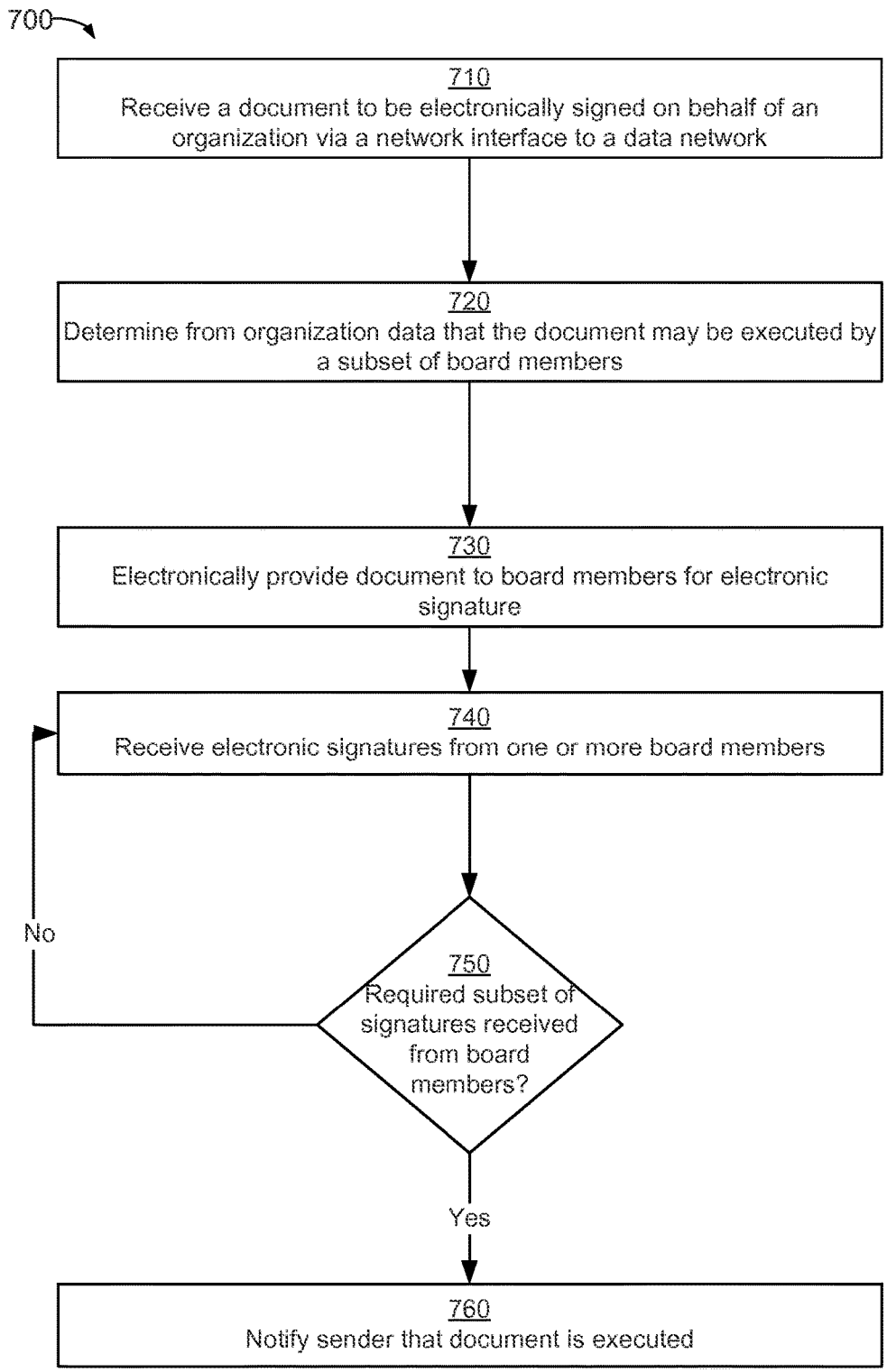
FIG. 7 is a flow chart illustrating an example method for automatically identifying an organization's board members as authorized signatories for executing an electronic document according to certain exemplary embodiments.

In additional or alternative embodiments, the electronic signature service 102 can identify a specified subset of authorized signatories for an organization 110. For example, FIG. 7 is a flow chart illustrating an example method 700 for automatically identifying an organization's board members as authorized signatories for executing an electronic document 104. For illustrative purposes, the method 700 is described with reference to the exemplary implementation depicted in FIGS. 1-4. Other implementations, however, are possible.

The method 700 involves receiving a document to be electronically executed on behalf of organization, as depicted in block 710. For example, the electronic signature service 102 can receive the document 104 from a sender 106 via a suitable electronic communication 107, as described above with respect to FIGS. 1-4 and in a similar manner as that described above with respect to block 510 in FIG. 5.

The method 700 also involves determining from organization data 108 that the document may be executed by a subset of board members, as depicted in block 720. Using the organization data 108 to determine that the document may be executed by a subset of board members can include one or more of the operations described above with respect to blocks 620 and/or 640 in FIG. 6, as well as one or more additional operations performed by a processing device executing the electronic signature service 102. For example, the electronic signature service 102 can determine from the organizational structure 200 that the organization 110 includes a board. The electronic signature service 102 can also determine from the rules 201 that the document 104 is legally binding if signed by a majority (i.e., the required subset) of the board members.

The method 700 also involves electronically providing the document 104 to the board members for their electronic signatures, as depicted in block 730. Electronically providing the document 104 to the board members for their electronic signatures can include one or more of the operations described above with respect to block 530 in FIG. 5, as well as one or more additional operations performed by a processing device executing the electronic signature service 102. For example, the electronic signature service 102 can reference the organization data 100 to identify the e-mail addresses or other electronic contact information for each of the board members. The electronic signature service 102 can notify the board members that the document 104 is available for signature by transmitting electronic communications 206a, 206b to electronic addresses specified in the electronic contact information for respective board members. As described above with respect to FIGS. 1-4, any suitable electronic communications 206a, 206b can be used to notify the board members of the availability of the document 104 for signature.

The method 700 also involves receiving electronic signatures from one or more board members, as depicted in block 740. Receiving electronic signatures from one or more board members can include one or more of the operations described above with respect to block 650 in FIG. 6, as well as one or more additional operations performed by a processing device executing the electronic signature service 102. For example, the electronic signature service 102 can receive electronic signatures via any suitable electronic communication, as described above with respect to FIGS. 3-4. For example, the electronic signature service 102 may receive electronic signatures from board members via a web portal by which each board member may access the document 104 using the electronic signature service 102, via an e-mail with the signed document 104 as an attachment, via a facsimile transmission of a copy of the document 104, or some combination thereof.

The method 700 also involves determining if a required subset of signatures has been received from the board members, as depicted in block 750. Receiving electronic signatures from one or more board members can include one or more of the operations described above with respect to block 650 in FIG. 6, as well as one or more additional operations performed by a processing device executing the electronic signature service 102. For example, if one of the rules 201 specifies that a majority of signatures from the board members is required for the document 104 to be legally binding, the electronic signature service 102 can determine at block 750 that a number of signatures greater than or equal to a majority have been received. If the required subset of signatures has been received from the board members, the electronic signature service 102 can notify the sender 106 that the document 104 is executed, as depicted at block 760. If the required subset of signatures has not been received from the board members, the method 700 can return to block 740.

Figure 8:
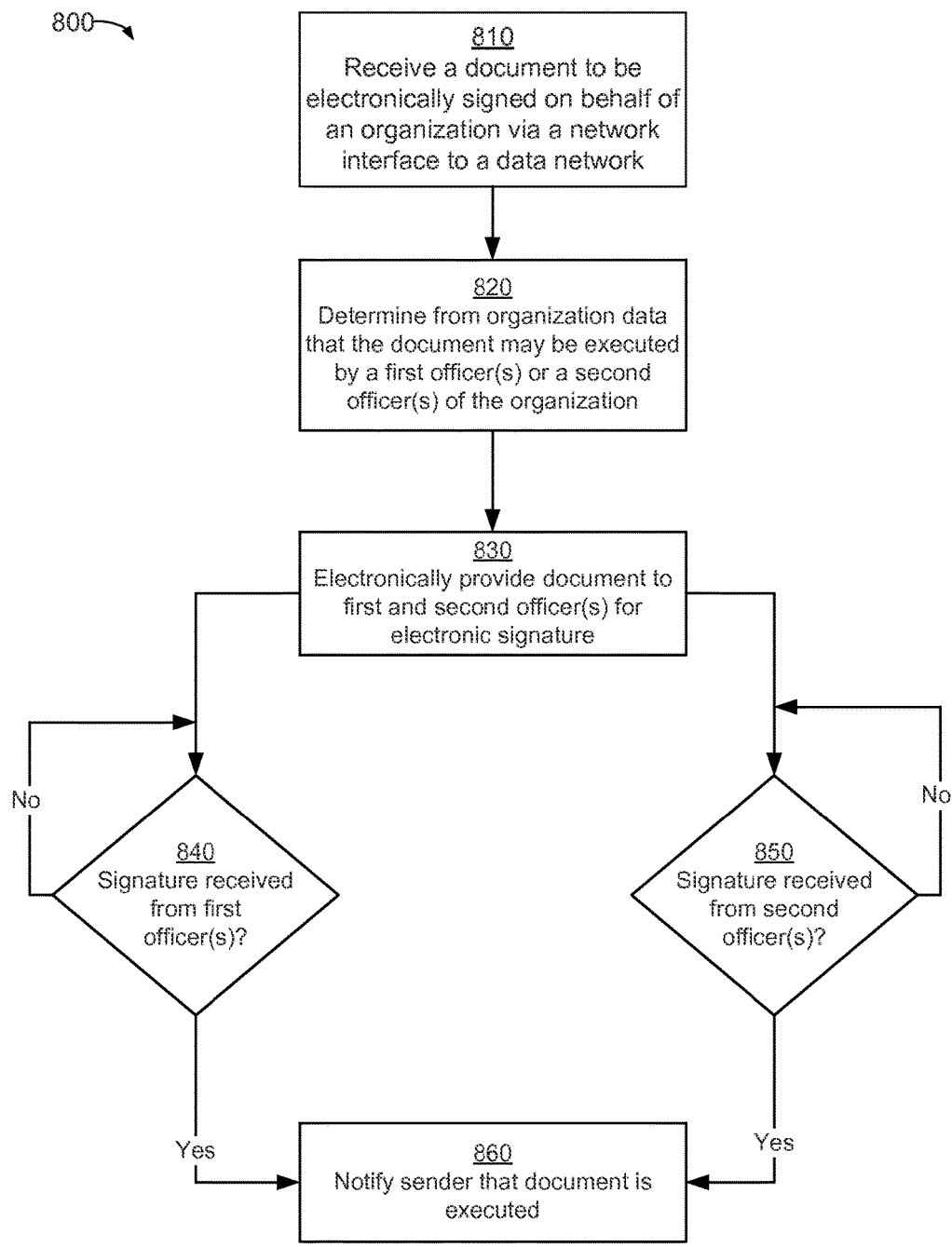
FIG. 8 is a flow chart illustrating an example method for automatically identifying different officers of an organization as authorized signatories for executing an electronic document according to certain exemplary embodiments.

In additional or alternative embodiments, the electronic signature service 102 can identify officers or groups of officers of an organization as authorized signatories. For example, FIG. 8 is a flow chart illustrating an example method 800 for automatically identifying different officers of an organization 110 as authorized signatories for executing an electronic document 104. For illustrative purposes, the method 800 is described with reference to the implementation depicted in FIGS. 1-4. Other implementations, however, are possible.

The method 800 involves receiving a document to be electronically executed on behalf of organization, as depicted in block 810. For example, the electronic signature service 102 can receive the document 104 from a sender 106 via a suitable electronic communication 107, as described above with respect to FIGS. 1-4 and in a similar manner as that described above with respect to block 510 in FIG. 5.

The method 800 also involves determining from organization data 108 that the document may be executed by a first officer (or group of officers) or a second officer (or group of officers) of the organization 110, as depicted in block 820. Determining from organization data 108 that the document may be executed by the first and second officers (or groups of officers) can include one or more of the operations described above with respect to blocks 620 and/or 640 in FIG. 6, as well as one or more additional operations performed by a processing device executing the electronic signature service 102. For example, the electronic signature service 102 can determine from the organizational structure 200 that the organization 110 includes multiple officers (e.g., a president, a secretary, and a chairperson of the board). The electronic signature service 102 can also determine from the rules 201 that the document 104 is legally binding if signed by either the first officer (or group of officers) or the second officer (or group of officers). For example, a first one of the rules 201 can specify that the document 104 is legally binding if signed by both the president and the secretary (i.e., the first officer or group of officers). A second one of the rules 201 can specify that the document 104 is legally binding if signed by the chairperson of the board (i.e., the second officer or group of officers).

The method 800 also involves electronically providing the document 104 to both the first and second officers (or groups of officers) for electronic signature, as depicted in block 830. Electronically providing the document 104 to both the first and second officers (or groups of officers) for electronic signature can include one or more of the operations described above with respect to block 530 in FIG. 5, as well as one or more additional operations performed by a processing device executing the electronic signature service 102. For example, the electronic signature service 102 can reference the organization data 100 to identify the e-mail addresses or other electronic contact information for each of the first and second officers. The electronic signature service 102 can notify the first and second officers that the document 104 is available for signature by transmitting electronic communications 206a, 206b to electronic addresses specified in the electronic contact information for the respective first and second officers. As described above with respect to FIGS. 1-4, any suitable electronic communications 206a, 206b can be used to notify the respective first and second officers of the availability of the document 104 for signature.

The method 800 also involves determining whether the required signature(s) from the first officer(s) have been received, as depicted in block 840. For example, the electronic signature service 102 can receive signature(s) 300 via suitable electronic communication(s) 300 from the first officer or group of officers (e.g., signatures from the president and the secretary). If the required signature(s) from the first officer(s) have been received, the method 800 involves notifying the sender 106 that the document 104 is executed, as depicted in block 860. If the required signature(s) from the first officer(s) have not been received, the electronic signature service 102 continues waiting for the remaining signature(s) from the first officer(s), as depicted by the method 800 returning to block 840.

The method 800 also involves determining whether the required signatures from the second officer or group of officers has been received, as depicted in block 850. For example, the electronic signature service 102 can receive signature(s) 400 via suitable electronic communication(s) 402 from the second officer or group of officers (e.g., signature from the chairperson of the board). If the required signature(s) from the second officer(s) have been received, the method 800 involves notifying the sender 106 that the document 104 is executed, as depicted in block 860. If the required signature(s) from the second officer(s) have not been received, the electronic signature service 102 continues waiting for the remaining signature(s) from the second officer(s), as depicted by the method 800 returning to block 850.

In some embodiments, the electronic signature service 102 may execute one or more processes that account for both the first and second officer returning signed copies of the document 104. In one non-limiting example, the electronic signature service 102 may notify the first officer that no further signatures are required after determining that the second officer has signed the document 104. In another non-limiting example, the electronic signature service 102 may bar the first officer from accessing the document 104 via a website after determining that the second officer has signed the document 104. In another non-limiting example, the electronic signature service 102 may simply discard a signature received from the first officer after determining that the second officer has signed the document 104.

Figure 9:
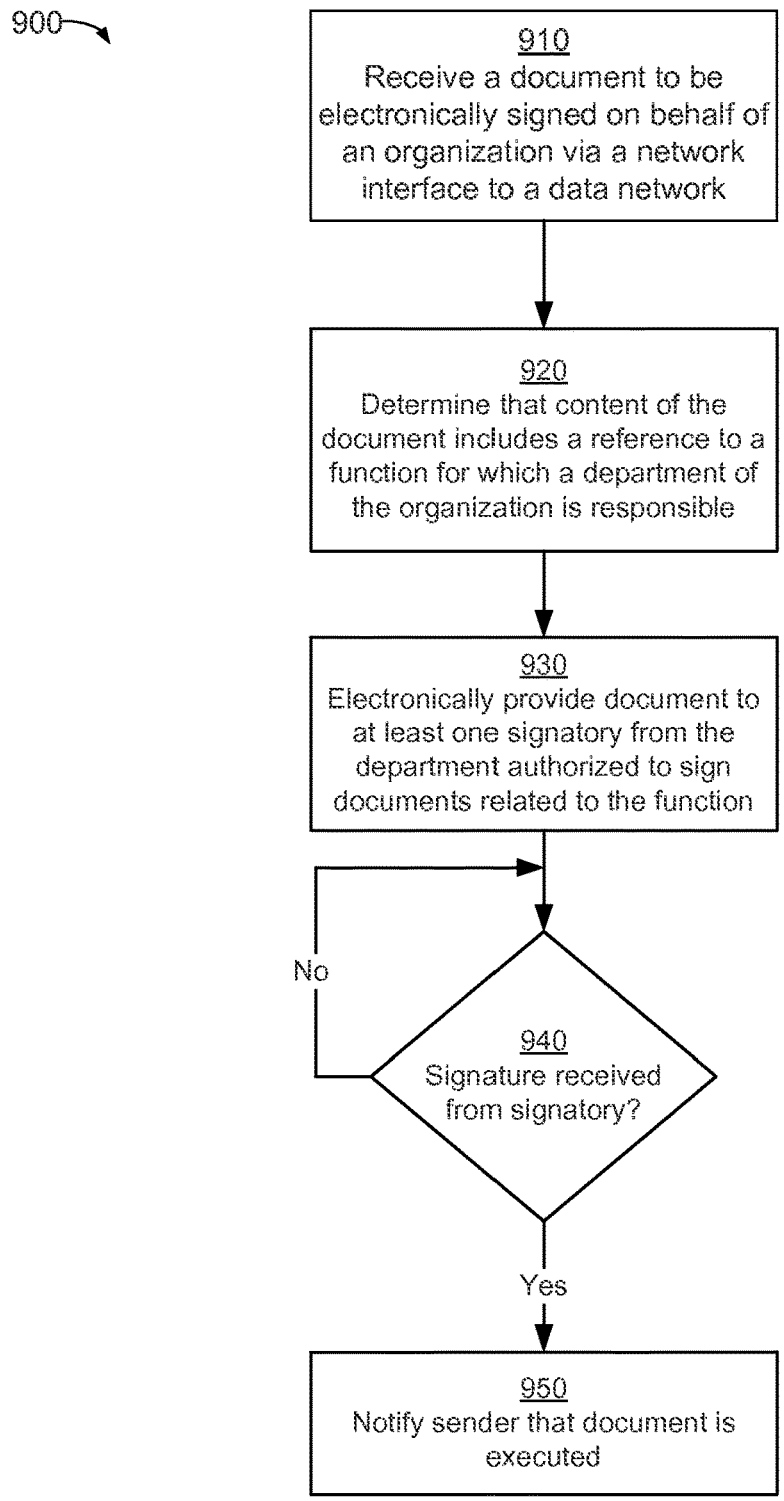
FIG. 9 is a flow chart illustrating an example method for automatically identifying signatories for executing an electronic document based on determining a department of an organization that has a function related to the document according to certain exemplary embodiments.

FIG. 9 is a flow chart illustrating an example method 900 for automatically identifying signatories for executing an electronic document 104 based on determining a department of the organization 110 that has a function related to the document 104. For illustrative purposes, the method 900 is described with reference to the implementation depicted in FIGS. 1-4. Other implementations, however, are possible.

The method 900 involves receiving a document to be electronically executed on behalf of organization, as depicted in block 910. For example, the electronic signature service 102 can receive the document 104 from a sender 106 via a suitable electronic communication 107, as described above with respect to FIGS. 1-4 and in a similar manner as that described above with respect to block 510 in FIG. 5.

The method 900 also involves determining that content of the document 104 includes a reference to a function for which a department of the organization 110 is responsible, as depicted in block 920. For example, the electronic signature service 102 can analyze the text of document 104 to identify one or more words or phrases in the document. The electronic signature service 102 can compare the identified words or phrases from the document with one or more organization functions described in the organization data 108. In one non-limiting example, the electronic signature service 102 may determine that the one or more words or phrases in the document refer to logistical functions (e.g., "load plans," "shipping routes," etc.) performed by a logistics department in the organization 110 as specified in the organization data 108. In another non-limiting example, the electronic signature service 102 may determine that the one or more words or phrases in the document refer to financial functions (e.g., "account record," "purchase order," etc.) performed by a financial department in the organization 110 as specified in the organization data 108.

The method 900 also involves electronically providing the document 104 to at least one signatory from the department that is authorized to sign documents related to the function, as depicted in block 930. Electronically providing the document 104 to at least one signatory from the department that is authorized to sign documents related to the function can include one or more of the operations described above with respect to block 530 in FIG. 5, as well as one or more additional operations performed by a processing device executing the electronic signature service 102. For example, the electronic signature service 102 can reference the organization data 108 to automatically identify one or more individuals from the department that are authorized to execute documents related to the identified department function (e.g., a vice president or manager in charge of a given department). The electronic signature service 102 can provide the document 104 to each identified signatory by transmitting a suitable electronic communication to the signatory (e.g., electronic mail, text message, etc.).

Any suitable process can be used for identifying appropriate signatories based on organization departments that identified by analyzing the content of the received document 104. In some embodiments, the electronic signature service 102 may select the lowest echelon in a hierarchical organization to identify an appropriate signatory for the document. For example, an organization may include chain of retail stores having stores in different states of a region of a country. The rules 201 may specify that a regional manager for the chain of stores is authorized to execute purchase orders for any store in any state and that each state-level manager for a respective state is authorized to execute purchase orders for any store in the respective state. The electronic signature service 102 may identify a state-level manager as a signatory rather than a regional-level manager based on the document 104 including references to a single state in the region rather than multiple states in the region.

In additional or alternative embodiments, the electronic signature service 102 may determine that the document 104 includes references to multiple departments in the organization and identify one or more signatories having authority over both departments. For example, the content of the document may include references to purchases by two different stores in two different states in a regional or national chain of stores. One of the rules 201 may specify that purchase orders that affect stores in multiple regions must be signed by a regional manager. The electronic signature service 102 may reference the organizational structure 200 to identify a regional manager for the region including both states references in the document 104. The electronic signature service 102 may electronically provide the document 104 to the regional manager or otherwise notify the regional manager that the document 104 is available for signature.

In additional or alternative embodiments, the electronic signature service 102 may identify an appropriate signatory based on content in the document 104 indicating that a given threshold condition has been satisfied. For example, the rules 201 may specify that contracts involving dollar amounts below a specified threshold may be executed by a lower-echelon department and that contracts involving dollar amounts above the specified threshold must be executed by a higher-echelon department. The electronic signature service 102 can determine from the content of the document 104 that the document 104 is a contract involving amounts above or below the specified threshold and can select a signatory from the appropriate echelon based on the rules 201.

The method 900 also involves determining if electronic signatures have been received from the identified signatories, as depicted in block 940. Determining if electronic signatures have been received from the identified signatories can include one or more of the operations described above with respect to block 650 in FIG. 6. If the electronic signatures have been received from the identified signatories, the method 900 involves notifying the sender 106 that the document 104 is executed, as depicted in block 950. If electronic signatures have not been received from the identified signatories, the electronic signature service 102 continues waiting for the required signatures, as depicted by the method 900 returning to block 940. In some embodiments, the electronic signature service 102 may be configured to notify the sender 106 and/or send follow-up notifications to the identified signatories if the electronic signatures have been received from the identified signatories within a specified amount of time. In additional or alternative embodiments, the electronic signature service 102 may reference a rule designating alternative signatories if an initially identified signatory has not signed the document 104 within a specified amount of time.

Figure 10:
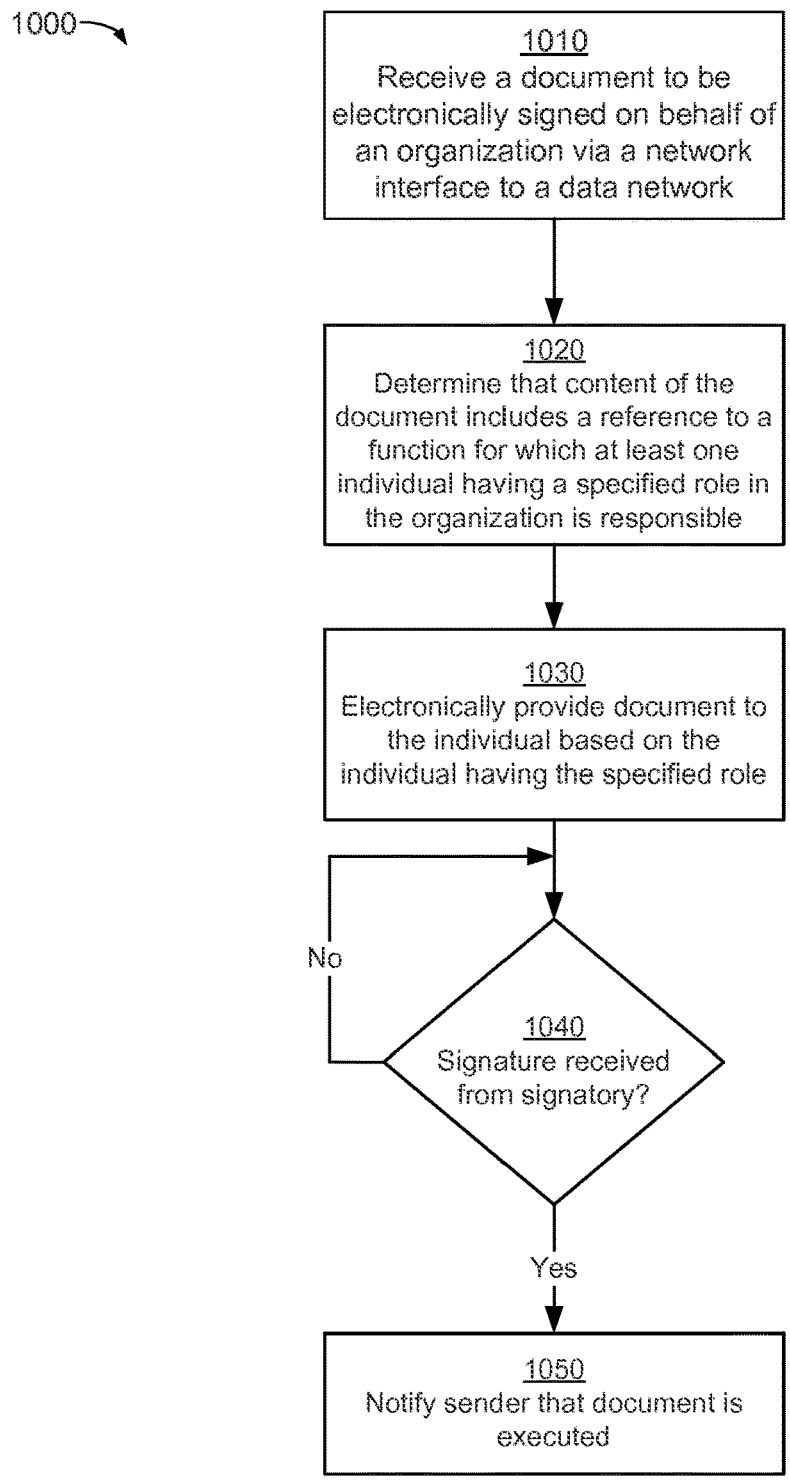
FIG. 10 is a flow chart illustrating an example method for automatically identifying signatories for executing an electronic document based on determining a role of an individual in an organization who has a function related to the document according to certain exemplary embodiments.

FIG. 10 is a flow chart illustrating an example method 1000 for automatically identifying signatories for executing an electronic document 104 based on determining a role of an individual in the organization 110 that has a function related to the document 104. For illustrative purposes, the method 1000 is described with reference to the implementation depicted in FIGS. 1-4. Other implementations, however, are possible.

The method 1000 involves receiving a document to be electronically executed on behalf of organization, as depicted in block 1010. For example, the electronic signature service 102 can receive the document 104 from a sender 106 via a suitable electronic communication 107, as described above with respect to FIGS. 1-4 and in a similar manner as that described above with respect to block 510 in FIG. 5.

The method 1000 also involves determining that content of the document 104 includes a reference to a function for which an individual having a specified role of the organization 110 is responsible, as depicted in block 1020. For example, the electronic signature service 102 can analyze the text of document 104 to identify one or more words or phrases in the document. The electronic signature service 102 can compare the identified words or phrases from the document with one or more functions specific to certain roles in the organization, as described in the structure 200 or other organization data 108.

For example, the electronic signature service 102 may receive a document 104 to be routed to an organization 110 such as a law firm handling patent matters. The electronic signature service 102 may determine that one or more words or phrases in the document refer to functions related to the filing and prosecution of patent applications (e.g., signing official communications). The electronic signature service 102 determine from the rules 201 that any individuals having the role "patent attorney" may perform the functions referenced by the identified words or phrases. Alternatively, the electronic signature service 102 may determine that one or more words or phrases in the document refer to functions related to entering into agreements with new clients. The electronic signature service 102 determine from the rules 201 that any individuals having the role "partner" may perform the functions referenced by the identified words or phrases.

The method 1000 also involves electronically providing the document 104 to at least one signatory from the role that is authorized to sign documents related to the function, as depicted in block 1030. Electronically providing the document 104 to at least one signatory having the role that is authorized to sign documents related to the function can include one or more of the operations described above with respect to block 530 in FIG. 5, as well as one or more additional operations performed by a processing device executing the electronic signature service 102. For example, the electronic signature service 102 can reference the organization data 108 to automatically identify one or more individuals having the specified role that are authorized to execute documents related to the identified function (e.g., a "patent attorney" at a law firm or a "partner" at the law firm). The electronic signature service 102 can provide the document 104 to each identified signatory by transmitting a suitable electronic communication to the signatory (e.g., electronic mail, text message, etc.).

The method 1000 also involves determining if electronic signatures have been received from the identified signatories, as depicted in block 1040. Determining if electronic signatures have been received from the identified signatories can include one or more of the operations described above with respect to block 650 in FIG. 6, as well as one or more additional operations performed by a processing device executing the electronic signature service 102. If the electronic signatures have been received from the identified signatories, the method 1000 involves notifying the sender 106 that the document 104 is executed, as depicted in block 1050. If electronic signatures have not been received from the identified signatories, the electronic signature service 102 continues waiting for the required signatures, as depicted by the method 1000 returning to block 1040.

In additional or alternative embodiments, it may be desirable for the electronic signature service 102 to automatically identify a signatory for executing an electronic document 104 that has authority similar to another signatory specified for the document 104. For example, the sender 106 may request that the electronic signature service 102 send a contract to "Joe Snuffy" for signature or the electronic signature service 102 may determine that the document 104 lists "Joe Snuffy" as the signatory. However, the sender 106 may be unaware that Joe Snuffy is no longer affiliated with the organization 110 or has been demoted from a managerial position in the organization 110. The electronic signature service 102 can assist the sender 106 with finding an appropriate signatory for the document 104, such as an individual who has assumed Joe Snuffy's previous responsibilities.

Figure 11:
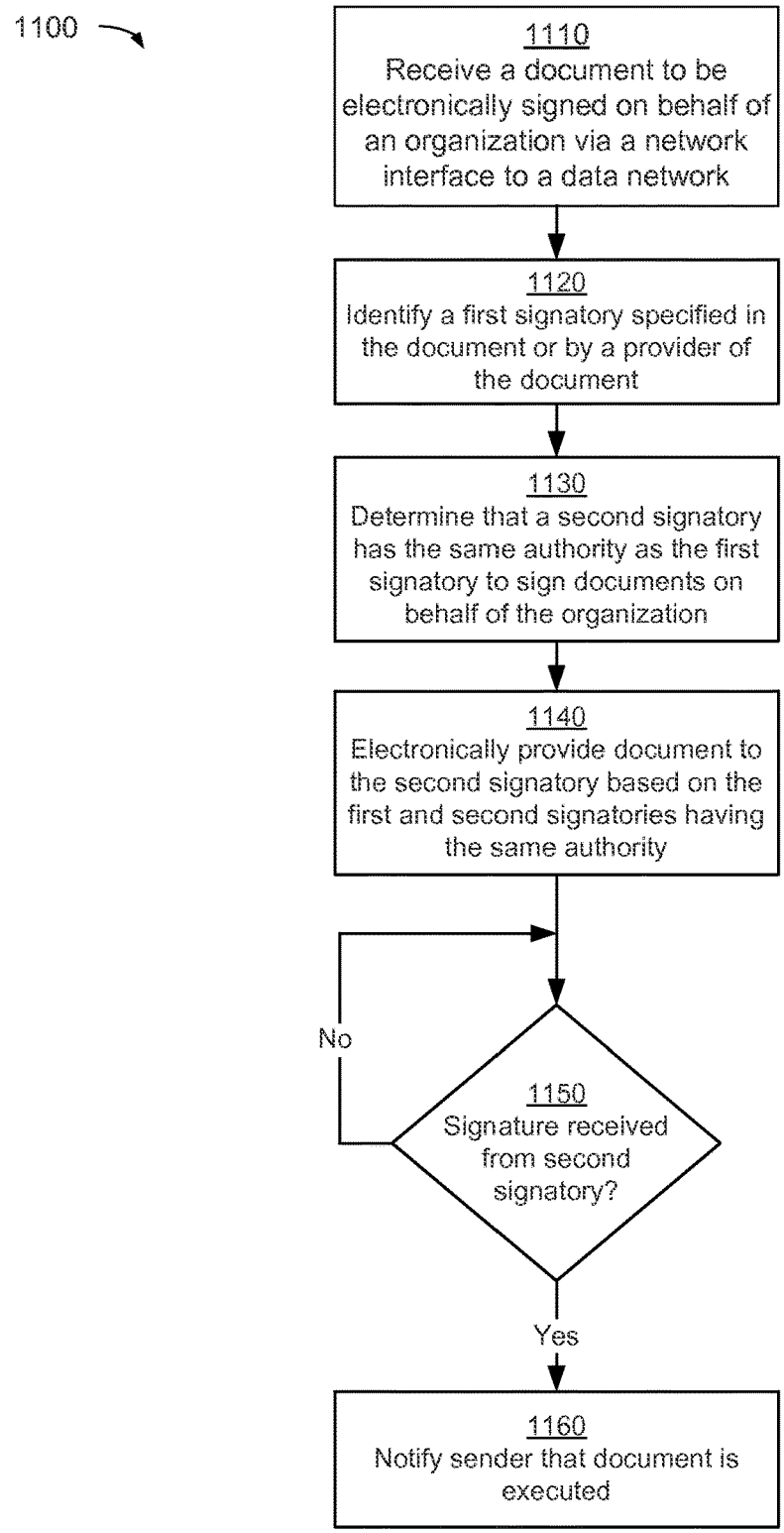
FIG. 11 is a flow chart illustrating an example method for automatically identifying a signatory for executing an electronic document based on determining that the signatory has authority similar to another signatory specified for the document according to certain exemplary embodiments.

For example, FIG. 11 is a flow chart illustrating an example method 1100 for automatically identifying a signatory for executing an electronic document 104 based on determining that the signatory has authority similar to another signatory specified for the document 104. For illustrative purposes, the method 1100 is described with reference to the implementation depicted in FIGS. 1-4. Other implementations, however, are possible.

The method 1100 involves receiving a document to be electronically executed on behalf of organization, as depicted in block 1110. For example, the electronic signature service 102 can receive the document 104 from a sender 106 via a suitable electronic communication 107, as described above with respect to FIGS. 1-4 and in a similar manner as that described above with respect to block 510 in FIG. 5.

The method 1100 also involves identifying a first signatory specified in the document or by a provider of the document, as depicted in block 1120. For example, the electronic signature service 102 can determine from data provided by the sender 106 via an electronic communication 107 or from analyzed content in the document 104 that a first signatory (e.g. "Joe Snuffy") is identified as the signatory for the document.

The method 1100 also involves determining that a second signatory has the same authority as the first signatory to sign documents on behalf of the organization, as depicted in block 1130. For example, the electronic signature service 102 can use the organization data 108 to determine the signature authority specified for Joe Snuffy. The electronic signature service 102 can also use the organization data 108 to identify one or more individuals in the organization 110 having signature authority that is the same as or similar to that of Joe Snuffy.

Any suitable process can be used to identify the second signatory. In one non-limiting example, the electronic signature service 102 may determine that an individual named "Jane Doe" is assigned to the same department as Joe Snuffy and is assigned to the same role as Joe Snuffy (e.g., a partner in the intellectual property department). In another non-limiting example, the electronic signature service 102 may determine from the organization data 108 that Joe Snuffy's employment with the organization has been terminated. The electronic signature service 102 may identify another individual in the organization 110 (e.g., Jane Doe) who has replaced Joe Snuffy and who therefore has the signature authority possessed by Joe Snuffy during his employment.

The method 1100 also involves electronically providing the document 104 to the second signatory based on the first and second signatories having the same authority, as depicted in block 1140. Electronically providing the document 104 to the second signatory based on the first and second signatories having the same authority can include one or more of the operations described above with respect to block 530 in FIG. 5. Any suitable electronic communication can be used to electronically provide the document 104 to the second signatory.

In some embodiments, the second signatory can be used to replace the first signatory. For example, the electronic signature service 102 may modify the document 104 to remove signature blocks or other references to the first signatory and to add corresponding signature blocks or other references to the second signatory. In other embodiments, the electronic signature service 102 can add the second signatory as an alternative to the first signatory. For example, the electronic signature service 102 may analyze the document 104 to identify signature blocks or other references to the first signatory and to add corresponding signature blocks or other references to the second signatory.

In additional or alternative embodiments, the electronic signature service 102 may respond to the identification of the second signatory by soliciting the approval by the sender 106 of any modifications to the document 104 that add the second signatory. For example, the electronic signature service 102 may automatically provide an interface in a web portal or an electronic communication to the sender 106 that solicits approval of the sender 106 to modify the document 104. The electronic signature service 102 may thereby add a signature block or other reference to the second signatory in response to receiving approval to modify the document.

In additional or alternative embodiments, the electronic signature service 102 can identify several potential individuals as the second signatory and solicit the input from the sender 106 selecting one or more of the potential individuals as the second signatory. For example, the electronic signature service 102 may determine that several potential signatories have the same role as the first signatory. The electronic signature service 102 may automatically provide an interface in a web portal or an electronic communication to the sender 106 that solicits input from the sender 106 to select the second signatory from the list of potential signatories. The electronic signature service 102 can electronically provide the document 104 to a signatory selected by the sender 106 from the list of potential signatories.

The method 1100 also involves determining if the electronic signature of the second signatory has been received, as depicted in block 1150. Determining if the electronic signature of the second signatory has been received can include one or more of the operations described above with respect to block 650 in FIG. 6, as well as one or more additional operations performed by a processing device executing the electronic signature service 102. If the electronic signature has been received, the method 1100 involves notifying the sender 106 that the document 104 is executed, as depicted in block 1160. If the electronic signatures have not been received from the second signatory, the electronic signature service 102 continues waiting for the required signatures, as depicted by the method 1100 returning to block 1150.

Although FIGS. 5-11 describe embodiments in which a sender 106 of the document 104 is notified that the document 104 is executed, other implementations are possible. For example, a sender 106 may be an individual or entity that belongs to the organization 110 and that is responsible for managing contracts or other legal documents for the organization 110. The individual or entity responsible for management of legal documents may utilize the electronic signature service 102 to determine an appropriate level of signature authority for a document 104. For example, the sender 106 may be unaware of which individuals in the organization 110 are authorized to sign the document. The sender 106 may specify the subject matter of the document 104, the electronic signature service 102 may determine the subject matter of the document 104 by analyzing the content of the document 104, and/or the electronic signature service 102 may determine potential types of subject matter of the document 104 and present suggested types of subject matter to the sender 106 via a graphical interface for selection by the sender 106. The electronic signature service 102 can determine an appropriate level of signature authority for the document 104 based on the subject matter of the document 104. The electronic signature service 102 can select one or more individuals having the appropriate signature authority using one or more of the processes described above with respect to FIGS. 5-11. The electronic signature service 102 can route the document 104 for signature without further involvement from or notification of the sender 106.

Any suitable server or other computing system can be used to implement the electronic signature service 102. For example, FIG. 12 is a block diagram depicting an example server system 1200 for implementing certain embodiments.

The server system 1200 can include a processor 1202 that is communicatively coupled to a memory 1204 and that executes computer-executable program instructions and/or accesses information stored in the memory 1204. The processor 1202 may comprise a microprocessor, an application-specific integrated circuit ("ASIC"), a state machine, or other processing device. The processor 1202 can include any of a number of processing devices, including one. Such a processor can include or may be in communication with a computer-readable medium storing instructions that, when executed by the processor 1202, cause the processor to perform the operations described herein.

The memory 1204 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 1200 may also comprise a number of external or internal devices such as input or output devices. For example, the server system 1200 is shown with an input/output ("I/O") interface 1208 that can receive input from input devices or provide output to output devices. A bus 1206 can also be included in the server system 1200. The bus 1206 can communicatively couple one or more components of the server system 1200.

The server system 1200 can execute program code for the electronic signature service 102. The program code for the electronic signature service 102 may be resident in any suitable computer-readable medium and execute on any suitable processor. In one embodiment, the program code for the electronic signature service 102 can reside in the memory 1204 at the server system 1200. In another embodiment, the program code for the electronic signature service 102 can be accessed by the server system 1200 from a remote content provider via a data network. The electronic signature service 102 stored in the memory 1204 can configure the processor 1202 to perform the operations described in FIGS. 1-10.

The server system 1200 can also include at least one network interface 1210. The network interface 1210 can include any device or group of devices suitable for establishing a wired or wireless data connection to a data network 1212. Non-limiting examples of the network interface 1210 include an Ethernet network adapter, a modem, and/or the like.

The server system 1200 can communicate with a computing system 1214 via the data network 1212. A computing system 1214 can include any suitable computing device for executing a client application 1216 configured for accessing the electronic signature service 102 via the network 1212. Non-limiting examples of a computing system 1214 include a desktop computer, a tablet computer, a laptop computer, or any other computing device. Non-limiting example of a client application 1216 include a web browser application, an e-mail application, a dedicated application for accessing the electronic signature service 102, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for controlling electronic access to electronic documents by authorized entities, the method comprising:
  receiving, by an electronic signature service and from a sender computing device associated with a sender, a document to be electronically signed on behalf of an organization, wherein the electronic signature service is executed by a processing device, wherein content of the document lacks any data specifying any authorized signatory for the document;
  identifying, by the electronic signature service, a first authorized signatory from the organization and a second authorized signatory from the organization for executing the document, wherein identifying the first authorized signatory and the second authorized signatory comprises:
    retrieving, from a database, organizational data describing an organizational structure and signature authorities for the organization,
    identifying, from an analysis of the document performed by the electronic signature service, a word or phrase included in text of the document;
    matching the identified word or phrase to a function indicated by the retrieved organizational data, and determining that the first authorized signatory and the second authorized signatory are both associated with the function;

transforming, by the electronic signature service, the document into (i) a first executable document by adding data to the document permitting the first executable document to be executed by the first authorized signatory and (ii) a second executable document by adding data to the document permitting the second executable document to be executed by the second authorized signatory; and executing, by the electronic signature service, a first phase of an electronic workflow among the sender computing device and one or more signatory computing devices, the first phase comprising granting, by the electronic signature service and during a first time period:
  (i) access to the first executable document by the sender computing device and a first computing device associated with the first authorized signatory, wherein the first computing device lacks access to the second executable document during the first time period, and
  (ii) access to the second executable document by the sender computing device and a second computing device associated with the second authorized signatory, wherein the second computing device lacks access to the first executable document during the first time period; and executing, by the electronic signature service, a second phase of the electronic workflow subsequent to the first phase, the second phase comprising:
  determining, by the electronic signature service and during a second time period, that the first executable document has been executed via communications between the first computing device and the electronic signature service;
  advancing the electronic workflow by preventing, during the second time period, the second computing device from accessing the second executable document based on the first executable document being executed; and
  providing, by the electronic signature service and during the second time period, the sender computing device with access to the first executable document as executed, wherein access to the second executable document by the sender computing device is maintained during the second time period.

2. The method of claim 1, wherein the first authorized signatory and the second authorized signatory are selected from a plurality of authorized signatories and further comprising:
  determining, by the electronic signature service, that a rule provided by the organization specifies that the document being signed by a subset of authorized signatories from the plurality of authorized signatories is sufficient to make the document legally binding;
  transforming, by the electronic signature service, the document into a set of executable documents by adding, to each executable document, data to the document permitting the executable document to be executed by a respective one of the plurality of authorized signatories;
  granting, by the electronic signature service, access to the set of executable documents by computing devices associated with the plurality of authorized signatories; and
  determining, by the electronic signature service, that the subset of authorized signatories have electronically signed the document provided to the plurality of authorized signatories, wherein the subset of authorized signatories includes the first authorized signatory and lacks the second authorized signatory, wherein the second computing device is prevented from accessing the second executable document based on the subset of the executable documents being received from a subset of the computing devices associated with the subset of authorized signatories.

3. The method of claim 2, further comprising:
  determining from the organizational structure that the plurality of authorized signatories comprises a plurality of board members for the organization; and
  determining that the subset of authorized signatories has signed the document by identifying a required number of signatures from the plurality of board members and determining, from executions of the subset of the executable documents, that the document has the required number of signatures, wherein the rule specifies a required number of signatures that is less than a number of board members.

4. The method of claim 2, further comprising:
  determining from the organizational structure that the plurality of authorized signatories comprises a first officer for the organization that is the first authorized signatory and a second officer that is the second authorized signatory for the organization;
  determining from the rule that each of the first officer and the second officer is authorized to sign documents on behalf of the organization; and
  determining that the subset of authorized signatories has signed the document by determining that either the first officer or the second officer has signed the document.

5. The method of claim 1, wherein identifying at least one of the first authorized signatory and the second authorized signatory comprises:
  determining, from the analysis of the document, that the document includes a reference to a department function for which a department of the organization is responsible; and
  identifying the at least one of the first authorized signatory and the second authorized signatory as being assigned to the department.

6. The method of claim 1, wherein identifying at least one of the first authorized signatory and the second authorized signatory comprises:
  determining, from the analysis of the document, that the document references an individual function for which an individual having a specified role in the organization is responsible; and
  identifying the at least one of the first authorized signatory and the second authorized signatory as being the at least one individual having the specified role.

7. A system comprising:
  a processing device;
  a network interface device configured to receive, from a sender computing device associated with a sender, a document to be electronically signed on behalf of an organization, wherein content of the document lacks any data specifying any authorized signatory for the document; and
  a non-transitory computer readable medium storing a document database with electronic documents,
  wherein the processing device is configured to execute instructions comprising an electronic signature service for controlling access to the electronic documents by performing operations comprising:

identifying a first authorized signatory from the organization and a second authorized signatory from the organization for executing the document, wherein identifying the first authorized signatory and the second authorized signatory comprises:
retrieving organizational data describing an organizational structure and signature authorities for the organization,
identifying, from an analysis of the document performed by the electronic signature service, a word or phrase included in text of the document that describes an action required by a signatory to the document;
matching the identified word or phrase to a stored word or phrase included in the retrieved organizational data and describing a function of the organization, and
determining, from the retrieved organizational data, that the first authorized signatory and the second authorized signatory are both associated with the function;

transforming the document into (i) a first executable document by adding data to the document permitting the first executable document to be executed by the first authorized signatory and (ii) a second executable document by adding data to the document permitting the second executable document to be executed by the second authorized signatory;

storing the first executable document and the second executable document in the document database;

executing a first phase of an electronic workflow among the sender computing device and one or more signatory computing devices, the first phase comprising granting, during a first time period:
(ii) access to the first executable document in the document database by the sender computing device and a first computing device associated with the first authorized signatory, wherein the first computing device lacks access to the second executable document during the first time period, and
(ii) access to the second executable document in the document database by the sender computing device and a second computing device associated with the second authorized signatory, wherein the second computing device lacks access to the first executable document during the first time period; and executing a second phase of the electronic workflow subsequent to the first phase, the second phase comprising:
determining, during a second time period, that the first executable document has been executed via communications between the first computing device and the electronic signature service,
advancing the electronic workflow by preventing, in the document database, the second computing device from accessing the second executable document from the document database based on the first executable document being executed, and
providing, during the second time period, the sender computing device with access to the first executable document and the second executable document, wherein access to the second executable document by the sender computing device is maintained during the second time period.

8. The system of claim 7, wherein the first authorized signatory and the second authorized signatory are selected from a plurality of authorized signatories and wherein the operations further comprise:
determining that a rule provided by the organization specifies that the document being signed by a subset of authorized signatories from the plurality of authorized signatories is sufficient to make the document legally binding;
transforming the document into a set of executable documents by adding, to each executable document, data to the document permitting the executable document to be executed by a respective one of the plurality of authorized signatories;
granting access to the set of executable documents by computing devices associated with the plurality of authorized signatories; and
determining that the subset of authorized signatories have electronically signed the document provided to the plurality of authorized signatories, wherein the subset of authorized signatories includes the first authorized signatory and lacks the second authorized signatory, wherein the second computing device is prevented from accessing the second executable document based on the subset of the executable documents being received from a subset of the computing devices associated with the subset of authorized signatories.

9. The system of claim 8, wherein the operations further comprise:
determining from the organizational structure that the plurality of authorized signatories comprises a first officer for the organization that is the first authorized signatory and a second officer that is the second authorized signatory for the organization;
determining from the rule that each of the first officer and the second officer is authorized to sign documents on behalf of the organization; and
determining that the subset of authorized signatories has signed the document by determining that either the first officer or the second officer has signed the document.

10. The system of claim 7, wherein identifying at least one of the first authorized signatory and the second authorized signatory comprises:
determining, from the analysis of the document, that the document includes a reference to a department function for which a department of the organization is responsible; and
identifying the at least one of the first authorized signatory and the second authorized signatory as being assigned to the department.

11. The system of claim 7, wherein identifying at least one of the first authorized signatory and the second authorized signatory comprises:
determining, from the analysis of the document, that the document references an individual function for which an individual having a specified role in the organization is responsible; and
identifying the at least one of the first authorized signatory and the second authorized signatory as being the at least one individual having the specified role.

12. A non-transitory computer-readable medium having program code of an electronic signature service stored thereon, the program code comprising:
program code for receiving, from a sender computing device associated with a sender, a document to be electronically signed on behalf of an organization, wherein the electronic signature service is executed by a processing device, wherein content of the document lacks any data specifying any authorized signatory for the document;

program code for identifying a first authorized signatory from the organization and a second authorized signatory from the organization for executing the document, wherein identifying the first authorized signatory and the second authorized signatory comprises:
- retrieving, from a database, organizational data describing an organizational structure and signature authorities for the organization,
- identifying, from an analysis of the document performed by the electronic signature service, a word or phrase included in text of the document that describes an action required by a signatory to the document;
- matching the identified word or phrase to a stored word or phrase included in the retrieved organizational data and describing a function of the organization, and
- determining, from the retrieved organizational data, that the first authorized signatory and the second authorized signatory are both associated with the function;

program code for transforming the document into (i) a first executable document by adding data to the document permitting the first executable document to be executed by the first authorized signatory and (ii) a second executable document by adding data to the document permitting the second executable document to be executed by the second authorized signatory;

program code for executing a first phase of an electronic workflow among the sender computing device and one or more signatory computing devices, the first phase comprising granting, during a first time period:
- (i) access to the first executable document by the sender computing device and a first computing device associated with the first authorized signatory, wherein the first computing device lacks access to the second executable document during the first time period, and,
- (ii) access to the second executable document by a second computing device associated with the second authorized signatory, wherein the second computing device lacks access to the first executable document during the first time period;

program code for executing a second phase of the electronic workflow subsequent to the first phase, the second phase comprising:
- determining, during a second time period, that the first executable document has been executed via communications between the first computing device and the electronic signature service,
- advancing the electronic workflow by preventing, during the second time period, the second computing device from accessing the second executable document based on the first executable document being executed, and
- providing, by the electronic signature service and during the second time period, the sender computing device with access to the first executable document and the second executable document, wherein access to the second executable document by the sender computing device is maintained during the second time period.

13. The non-transitory computer-readable medium of claim 12, wherein the first authorized signatory and the second authorized signatory are selected from a plurality of authorized signatories and further comprising:
- program code for determining that a rule provided by the organization specifies that the document being signed by a subset of authorized signatories from the plurality of authorized signatories is sufficient to make the document legally binding;
- program code for transforming the document into a set of executable documents by adding, to each executable document, data to the document permitting the executable document to be executed by a respective one of the plurality of authorized signatories;
- program code for granting access to the set of executable documents by computing devices associated with the plurality of authorized signatories; and
- program code for determining that the subset of authorized signatories have electronically signed the document provided to the plurality of authorized signatories, wherein the subset of authorized signatories includes the first authorized signatory and lacks the second authorized signatory, wherein the second computing device is prevented from accessing the second executable document based on the subset of the executable documents being received from a subset of the computing devices associated with the subset of authorized signatories.

14. The non-transitory computer-readable medium of claim 12, wherein identifying at least one of the first authorized signatory and the second authorized signatory comprises:
- determining, from the analysis of the document, that the document includes a reference to a department function for which a department of the organization is responsible; and
- identifying the at least one of the first authorized signatory and the second authorized signatory as being assigned to the department.

15. The non-transitory computer-readable medium of claim 12, wherein identifying at least one of the first authorized signatory and the second authorized signatory comprises:
- determining, from the analysis of the document, that the document references an individual function for which an individual having a specified role in the organization is responsible; and
- identifying the at least one of the first authorized signatory and the second authorized signatory as being the at least one individual having the specified role.

* * * * *